Oct. 5, 1926.
H. E. FIGGIE ET AL
BUMPER
Filed Jan. 6, 1926
1,601,794
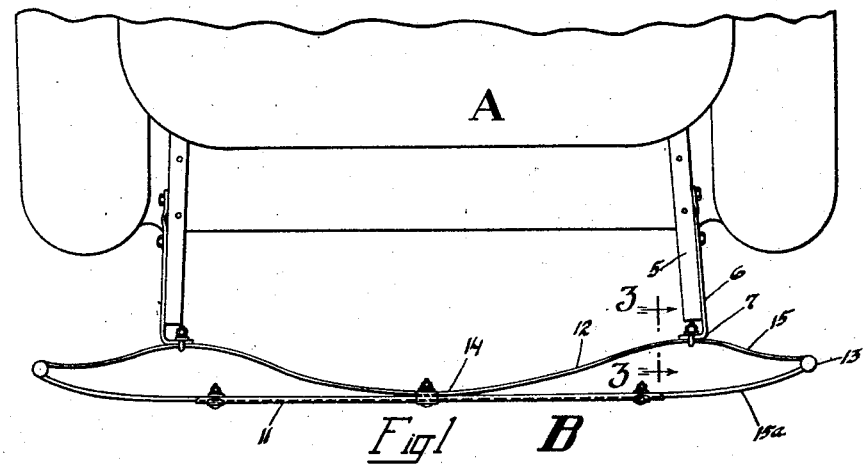
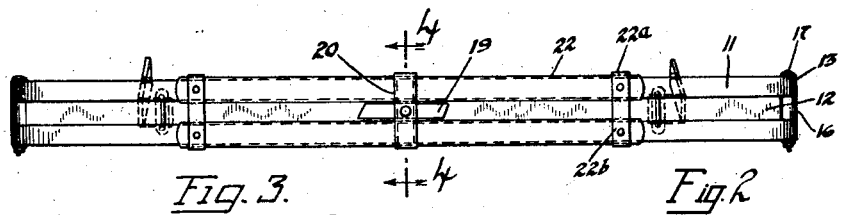
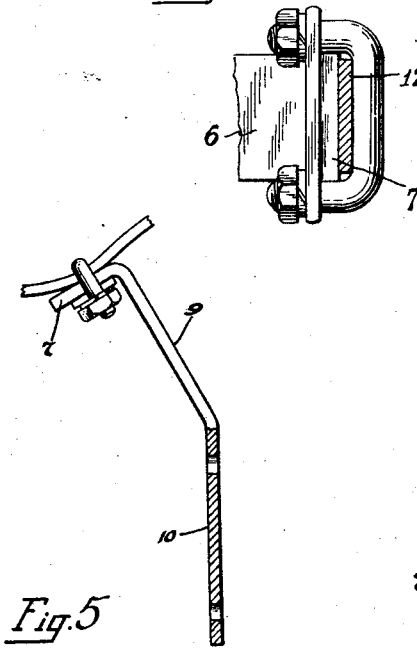
Inventor
ALBERT G. GEISTERT
& HARRY E. FIGGIE Patented Oct. 5, 1926.

1,601,794

UNITED STATES PATENT OFFICE.

HARRY E. FIGGIE, OF CORAOPOLIS, PENNSYLVANIA, AND ALBERT G. GEISTERT, OF DETROIT, MICHIGAN, ASSIGNORS TO GENERAL MOTORS CORPORATION, OF DETROIT, MICHIGAN, A CORPORATION OF DELAWARE.

BUMPER.

Application filed Janaury 6, 1926. Serial No. 79,647.

Our invention relates to improvements in bumpers or fenders for vehicles, automobiles, etc., and has for its object the provision of a bumper or fender which will be simple in construction, durable in operation and use, and yieldable in every direction from which a jarring force or impact may reasonably be expected to come.

Other objects will appear hereinafter.

A feature of our invention comprises a particular arrangement of the supporting bracket for the bumper which lends strength and bracing effect to the bumper, as well as permitting a small degree of relative motion between the said bumper and bracket when a strong impact is imparted to the bumper.

A feature of our invention involves a novel slide block construction comprising a yieldable means of attachment between the front members and the rear member of the bumper, which frictionally engages the said bars and functions to reduce any relative motion between the bars.

In the accompanying drawings:

Figure 1 is a fragmentary view of the rear end of an automobile provided with a device constructed in accordance with our invention.

Figure 2 is a front elevation of the said device.

Figure 3 is a sectional detail view taken on Figure 1 at the plane of the line 3—3.

Figure 4 is a sectional side elevation of the sliding block attachment taken on Figure 2 at the plane of the lines 4—4.

Figure 5 is an enlarged plan view of the type of bracket used to attach our bumper to the front end of an automobile.

Referring now more particularly to the drawings, there will be seen a bumper or fender B mounted on a pair of longitudinal frames 5, forming a part of the construction of the rear end A of an automobile.

A pair of attaching brackets 6 are secured to the side frames 5 in any convenient manner, as for instance, by means of a U-clamp. The brackets preferably extend rewardly and downwardly, and are preferably divergently disposed to one another (see particularly Figure 1) for a purpose hereinafter to be described.

Said brackets are formed with laterally inwardly-extending ears 7, the said ears preferably forming an acute angle with the main portion of said bracket for a purpose hereinafter to be explained. The said ears are further slightly offset downwardly from the main body portions.

The bumper B is yieldably engaged by the said brackets through any convenient medium such as, for instance, U-clamps and the like. It will be understood, however, that we do not desire to limit ourselves to the above described structure, as another construction which suits our purpose to advantage is to make the ears 7 hingedly mounted upon the straight line portions of the brackets 6.

Brackets to support the front bumpers are preferably fashioned after the manner shown in Figure 5. The ear 7, of each bracket, in this case, is carried by a straight portion 9 bent outwardly from the body portion 10 of the said bracket.

The bumper B comprises a pair of spring steel oil-tempered front or impact bars 11, and a centre or rear bar 12 having each end mounted between the said bars 11.

The front bars 12 are normally straight throughout the greater portion of their length, but have the end portions deflected rearwardly to form resilient portions 15$^a$, the said bars terminating in suitable fastening means. In this instance, each end is bent over upon itself to form a sleeve or eye 13.

The centre or rear bar 12 has a forwardly deflected portion 14 to provide a supplemental or auxiliary impact receiving portion, as will hereinafter be explained. The said portion 14 at each end extends outwardly and forwardly to any convenient ogee curve 15, comprising outer resilient portions. Each end of the centre bar 12 at points adjacent the said sleeve 13 has formed sleeves 16 similar to the sleeves hereinbefore mentioned.

Fastening means such as hinge bolts 17 yieldably secure the said bars together, eliminate all rattle and serve as individual pivots for the resilient portions, thereby reducing liability of breakage upon impact.

The bars 11 and 12 are further yieldably held in contiguous relation by a novel slide block construction (see Figure 4), constituting an important part of our invention.

In the preferred embodiment of our invention, there is provided a resilient presser plate 18 (see Figure 4) made of spring steel and dished out, so to speak, to receive transversely thereof the front side of the middle portion of the centre bar in a plane substantially the same as the plane of the marginal portions of the said plate.

The said plate serves as a means for yieldably connecting the said bars together in conjunction with an apertured insert block 19 and a front member 20, the latter comprising an apertured metal strip formed with turned down ends.

It will be understood that while the said block 19 is made preferably parallelagrammatic in shape to suit our purpose, obviously any shape may fittingly be used.

The bar 12 is provided with a centrally disposed tapping $12^a$, in which is fitted a carriage bolt 21 carrying the aforesaid members 18 and 20 and the said block 19, in the manner as illustrated in Figure 4.

A washer $21^a$ and nut $21^b$ serve to lightly clamp the several parts together and hold the same in a yieldable connection by virtue of the resiliency of the member 18.

There may desirably be provided lustrous metal jackets 22 facing the forward straight portions of the front bars 11. Suitable fastening clips $22^a$ with means as indicated at $22^b$ may be conveniently used to secure the said jackets 22 in place.

The herein described construction permits advantages not accruing to the present day fender. When a blow or a jar of ordinary intensity is received by the front or impact bar 11, the latter flexes inwardly between its ends to a degree corresponding with the blow, and adapts itself by means of the slide block construction hereinbefore described in detail to a convenient position without incurring severe strain or shearing action. At the same time the resilient ends of the rear bar yield to permit this flexing.

For extreme blows by virtue of the angular disposition of the ears of the brackets with respect to the curved surfaces of the bar 12 and yieldability of the bars past the U-clamps, or the hinge connections of the bracket ears hereinbefore specifically referred to, the front or centre bar 12 is permitted to flex considerably forwardly, thereby effectually absorbing the shock, and translating a forward thrust into lateral tension upon the said brackets. It will be apparent that the oblique ears enable the U-clamp connection to yield sufficiently to prevent any breakage of parts.

It will be obvious that the said brackets mounted closely on the frames 5 and divergently disposed to each other are peculiarly adapted to sustain the lateral tension. The resiliency of the spring steel bars after absorbing the shock quickly and efficiently restores the said fender to normal shape.

The sliding block 19, as will best be seen from a reference to Figure 4, is rigidly carried by the rear bar 12, and functions to engage the inner edges of the bars 11. The front and rear members 20 and 18 normally aid in retaining the bars 11 and the bar 12 in fixed relation to each other.

From the construction hereinbefore described, it will be understood that a yieldable engagement of the bars is at all times maintained to permit a relative movement between them, should a sufficient force of impact be transmitted to the said bars.

The sliding block by its frictional contact with both bars 11 drags and decreases this movement, obviously without any shearing of parts. The resiliency of the whole device after the absorption of the given shock then overcomes the resiliency in the member 18, and normal disposition of parts is again obtained.

Modifications of the above invention may be made within the spirit and scope of our invention.

We claim:

1. The combination of a pair of flexible bars normally straight throughout the greater portion of their length, the said bars superimposed over and vertically spaced from each other, a third flexible bar having its opposite ends connected to the ends of the said bars and resiliently mounted therebetween, the ends of the said third bar being deflected outwardly from the said bars to form resilient lobes therewith, and a block slidably mounted between the said first mentioned bars rigidly connected to the said third bar, means to maintain a resilient engagement of the said block with the first-mentioned bars and to normally prevent a relative motion of the said first mentioned bars and the said third bar.

2. The combination of a pair of flexible bars normally straight throughout the greater portion of their length, the said bars superimposed over and vertically spaced from each other, a third flexible bar having its opposite ends connected to the ends of the said bar, the ends of the said third bar being deflected outwardly from the said bars to form resilient lobes therewith, a pair of lustrous jackets fitted over the middle portions of the upper and lower said bars, means comprising a slidable block engaging the sides of the said first-mentioned bars, yieldable means to hold the said first-mentioned bars and third bar normally in attached positions, the said means yieldable for any abnormal condition to permit a relative motion between said parts and accommodate the said parts without any shearing action.

In testimony whereof we affix our signatures.

HARRY E. FIGGIE.
ALBERT G. GEISTERT.